United States Patent
Mcgary (10) Patent No.: US 12,469,385 B2
(45) Date of Patent: Nov. 11, 2025

(54) SYSTEM, METHOD, AND COMPUTER PROGRAM FOR DYNAMIC VEHICLE COMMUNICATION

(71) Applicant: TOYOTA JIDOSHA KABUSHIKI KAISHA, Toyota (JP)

(72) Inventor: Caleb Mcgary, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/432,960

(22) Filed: Feb. 5, 2024

(65) Prior Publication Data

US 2025/0252851 A1   Aug. 7, 2025

(51) Int. Cl.
G08G 1/017 (2006.01)
G07C 5/00 (2006.01)

(52) U.S. Cl.
CPC ............. G08G 1/017 (2013.01); G07C 5/008 (2013.01)

(58) Field of Classification Search
CPC ................................ G08G 1/017; G07C 5/008
See application file for complete search history.

(56) References Cited

U.S. PATENT DOCUMENTS

| | | | |
|---|---|---|---|
| 2019/0103020 A1* | 4/2019 | Sakuma | G08B 13/19647 |
| 2020/0160714 A1 | 5/2020 | Inaba et al. | |
| 2020/0228950 A1* | 7/2020 | Clark | H04L 67/06 |
| 2022/0084328 A1* | 3/2022 | Kishikawa | G07C 5/02 |
| 2022/0223045 A1* | 7/2022 | Edwards | H04W 4/46 |

FOREIGN PATENT DOCUMENTS

JP    2018-160922 A    10/2018

* cited by examiner

Primary Examiner — Sisay Yacob
(74) Attorney, Agent, or Firm — Sughrue Mion, PLLC (57) ABSTRACT

Provided are system, method, and device for automatically manage communications between vehicles. According to embodiments, the system may include: a memory storage storing computer-executable instructions; and at least one processor communicatively coupled to the memory storage, wherein the at least one processor may be configured to execute the instructions to: receive an identification of a target vehicle from a server; obtain an identification of a nearby vehicle from the nearby vehicle; determine whether the identification of the target vehicle matches the identification of the nearby vehicle; and in response to determining that the identification of the target vehicle matches the identification of the nearby vehicle, transmit a current time and location to the server.

20 Claims, 7 Drawing Sheets

SYSTEM, METHOD, AND COMPUTER PROGRAM FOR DYNAMIC VEHICLE COMMUNICATION

TECHNICAL FIELD

Systems, methods, and computer programs consistent with example embodiments of the present disclosure relate to a vehicle, and more specifically, relate to communications between vehicles.

BACKGROUND

Modern vehicles are capable of performing a wide range of complex functions, such as generating telemetry data, transmitting and receiving data via the internet, and the like. In order for the vehicles to perform the above functions, said vehicles are inherently connected to an upstream server.

Among such functions, vehicle tracking is an important process for determining a geographical location of a vehicle. There are various purposes for tracking a geographical location of a vehicle, such as managing a fleet of service vehicles, emergency vehicles, and public transport vehicles, as well as tracking a suspect/stolen vehicles. In the related art, a location of a vehicle is determined by having the vehicle report its location to a server periodically or at an irregular basis when checking in to the server.

Further among such functions, vehicle software management is an important process for receiving and applying software updates to a vehicle. In the related art, the software update of a vehicle may be received by having the server directly transmitting the software update to the vehicle.

Nevertheless, the above approaches for locating the vehicle and receiving the software update in the related art may have at least the following shortcomings.

Once a vehicle is of a certain age, said vehicle may no longer be able to communicate with the server due to its aging components no longer being supported by the cellular network. In this regard, since the vehicle's location is obtained when the vehicle reports its location to the server and since the software update is received from the server, the server may no longer be able to locate and provide software update to the vehicle once the vehicle is of a certain age and is no longer be able to communicate with the server. For example, a vehicle having a 3G modem may not be able to communicate with the server, since the cellular network may no longer support/listen for signals from such 3G modem.

Accordingly, there is a need for a system that is able to locate and identify vehicles with aging hardware that are not able to communicate with the server, as well as to assist such vehicles in receiving a software update.

SUMMARY

Example embodiments of the present disclosure automatically manage communications between vehicles. As such, example embodiments of the present disclosure allows for vehicles with aging hardware that are not able to communicate with the server to be located, as well as for assisting such vehicles in receiving a software update.

According to embodiments, a system is provided. The system may include: a memory storage storing computer-executable instructions; and at least one processor communicatively coupled to the memory storage, wherein the at least one processor may be configured to execute the instructions to: receive an identification of a target vehicle from a server; obtain an identification of a nearby vehicle from the nearby vehicle; determine whether the identification of the target vehicle matches the identification of the nearby vehicle; and in response to determining that the identification of the target vehicle matches the identification of the nearby vehicle, transmit a current time and location to the server.

According to embodiments, the at least one processor may be further configured to execute the instructions to: receive a list from the nearby vehicle; in response to determining that the identification of the target vehicle does not match the identification of the nearby vehicle, determine whether the received list includes the identification of the target vehicle; and in response to determining that the received list includes the identification of the target vehicle, transmit a current time and location to the server.

According to embodiments, the received list may include a hashed list including one or more International Mobile Equipment Identity (IMEI) which the nearby vehicle has identified.

According to embodiments, the at least one processor may be further configured to execute the instructions to record the obtained identification of the nearby vehicle in a list.

According to embodiments, the nearby vehicle may be a first nearby vehicle; and the at least one processor may be configured to execute the instructions to transmit the list to a second nearby vehicle.

According to embodiments, the identification of the target vehicle and the identification of the nearby vehicle may include an International Mobile Equipment Identity (IMEI).

According to embodiments, the identification of the nearby vehicle may be received via shortwave radio, direct communication between Digital Communications Module (DCM) and Digital Communications Module (DCM), or Bluetooth.

According to embodiments, a method is provided. The method may include: receiving an identification of a target vehicle from a server; obtaining an identification of a nearby vehicle from the nearby vehicle; determining whether the identification of the target vehicle matches the identification of the nearby vehicle; and in response to determining that the identification of the target vehicle matches the identification of the nearby vehicle, transmitting a current time and location to the server.

According to embodiments, the method may further include: receiving a list from the nearby vehicle; in response to determining that the identification of the target vehicle does not match the identification of the nearby vehicle, determining whether the received list includes the identification of the target vehicle; and in response to determining that the received list includes the identification of the target vehicle, transmitting a current time and location to the server.

According to embodiments, the received list may include a hashed list including one or more International Mobile Equipment Identity (IMEI) which the nearby vehicle has identified.

According to embodiments, the method may further include recording the obtained identification of the nearby vehicle in a list.

According to embodiments, the nearby vehicle may be a first nearby vehicle; and the method may further include transmitting the list to a second nearby vehicle.

According to embodiments, the identification of the target vehicle and the identification of the nearby vehicle may include an International Mobile Equipment Identity (IMEI).

According to embodiments, the identification of the nearby vehicle is received via shortwave radio, direct communication between Digital Communications Module (DCM) and Digital Communications Module (DCM), or Bluetooth.

According to embodiments, a non-transitory computer-readable recording medium is provided. The non-transitory computer-readable recording medium may have recorded thereon instructions executable by at least one processor to cause the at least one processor to perform a method including: receiving an identification of a target vehicle from a server; obtaining an identification of a nearby vehicle from the nearby vehicle; determining whether the identification of the target vehicle matches the identification of the nearby vehicle; and in response to determining that the identification of the target vehicle matches the identification of the nearby vehicle, transmitting a current time and location to the server.

According to embodiments, the method may further include: receiving a list from the nearby vehicle; in response to determining that the identification of the target vehicle does not match the identification of the nearby vehicle, determining whether the received list includes the identification of the target vehicle; and in response to determining that the received list includes the identification of the target vehicle, transmitting a current time and location to the server.

According to embodiments, the received list may include a hashed list including one or more International Mobile Equipment Identity (IMEI) which the nearby vehicle has identified.

According to embodiments, the method may further include recording the obtained identification of the nearby vehicle in a list.

According to embodiments, the nearby vehicle may be a first nearby vehicle; and the method may further include transmitting the list to a second nearby vehicle.

According to embodiments, the identification of the target vehicle and the identification of the nearby vehicle may include an International Mobile Equipment Identity (IMEI).

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

Figure 1:
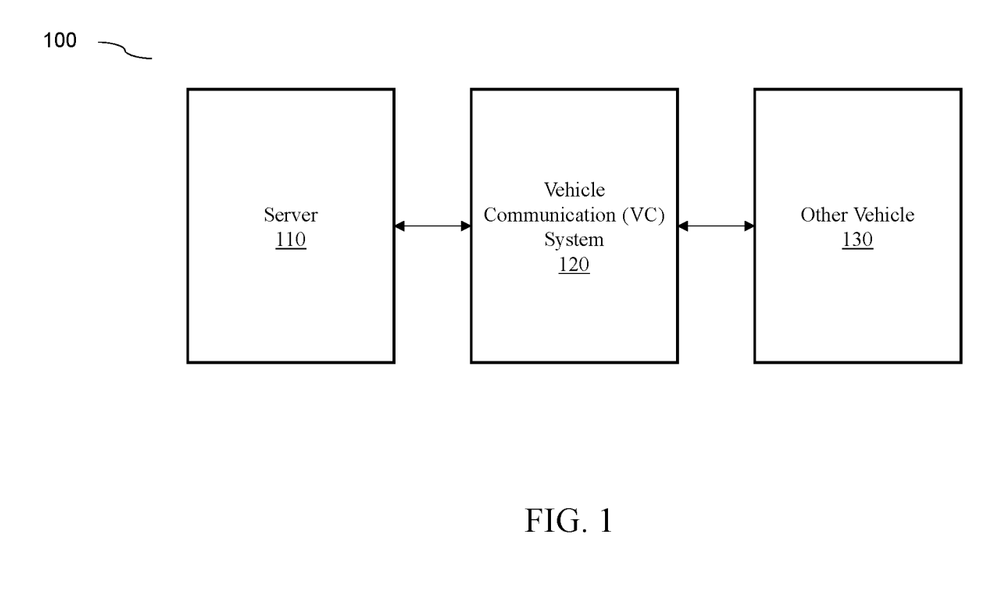
FIG. 1 illustrates a block diagram of an example system configuration for vehicle communication, according to one or more embodiments.

FIG. 1 illustrates a block diagram of an example system configuration 100 for vehicle communication, according to one or more embodiments. As illustrated in FIG. 1, system configuration 100 may include a server 110, a Vehicle Communication (VC) System 120, and other vehicle 130.

Server 110 may include a cloud server, a hybrid cloud server, a server cluster, and the like that is configured to track and manage vehicles in a network. Server 110 may be remote from the VC system 120, and may be communicatively coupled to the VC system 120 via a cellular network.

VC system 120 may include an apparatus, a system, a platform, a module, or the like, which may be configured to perform one or more operations or actions for managing vehicle communication, in order to locate a vehicle and to assist a vehicle software update. According to embodiments, the VC system 120 may be included in a vehicle (hereinafter "current vehicle"). According to embodiments, the VC system 120 may be included in a plurality of vehicles, and may be configured to communicate with each other.

The VC system 120 may also include one or more components that enable the VC system 120 to communicate with the server 110 and/or other vehicle 130. For example, the VC system 120 may include a Digital Communications Module (DCM). The DCM may be an electronic control unit (ECU) that contains a cellular modem, and may be configured to communicate with the server 110 via a cellular network and a base station. The DCM may also be configured to communicate with other vehicle 130 via shortwave radio, direct communication between DCM and DCM, Bluetooth, and the like. Accordingly, the VC system may act as a vehicle cellular sniffer.

For example, a DCM installed in a vehicle may have a listener for responses from a base station, and may be repurposed to also listen for outbound communications from other vehicles when it has not initiated a callback to the cellular base station. Further, the DCM may perform call back periodically for a long period (e.g., once every 10 minutes) when the vehicle is driving, and periodically for a short period (e.g., once every two seconds) when the vehicle is off and the battery level is above an acceptable level. The callback for when the vehicle is off is shorter as the cellular modem must look for a remote start command from the cloud. On the other hand, the callback for when the vehicle is driving is longer so the cellular modem can listen for extended periods of time to catalog callbacks of other vehicles that are in the vicinity. These callbacks may be recorded and stored locally on the vehicle, with the vehicle storing a linked list of the last X number of IMEIs that it observed. Further, a modern vehicle may be able to detect that an outdated DCM is functioning on another vehicle (meaning it can be aware that a 3G signal is being transmitted, but will be unable to respond via cellular).

Example operations performable by the VC system 120 for managing vehicle communication (i.e., locate a vehicle and assist a vehicle software update) are described below with reference to FIG. 3 to FIG. 7. Further, several example components which may be included in the VC system 120, according to one or more embodiments, are described below with reference to FIG. 2.

Other vehicle 130 may include any kinds of vehicle that is traveling near the VC system 120. For example, other vehicle 130 may include a vehicle that is traveling in the same direction and within a communication range of the VC system 120. According to embodiments, other vehicle 130 may also include the VC system 120. According to embodiments, other vehicle 130 may not include the VC system, but is still able to communicate with the VC system 120 in the current vehicle.

Figure 2:
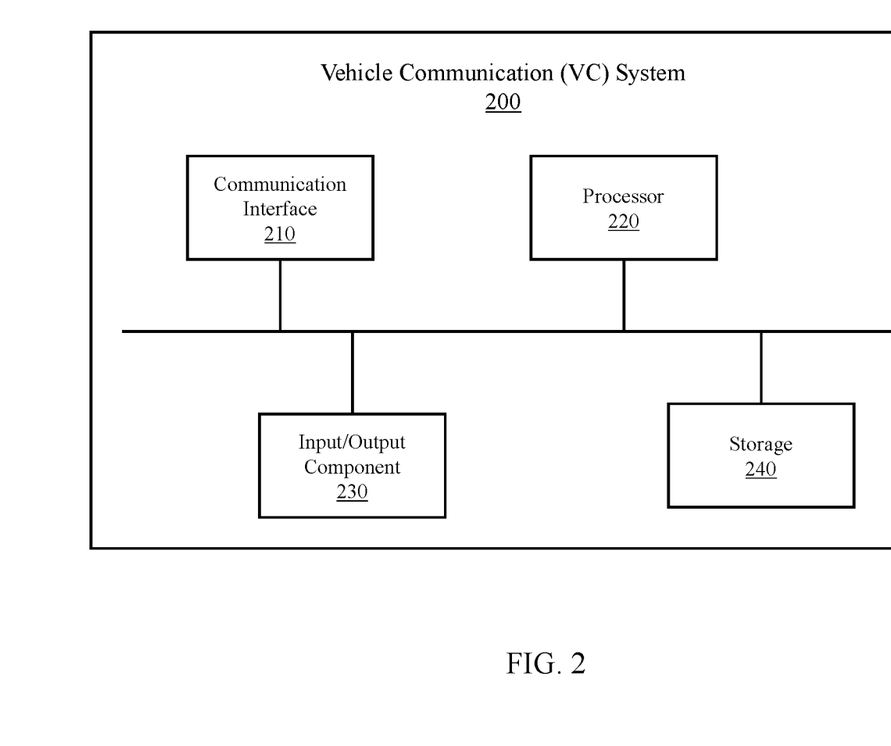
FIG. 2 illustrates a block diagram of example components in a VC system, according to one or more embodiments.

FIG. 2 illustrates a block diagram of example components in a VC system 200, according to one or more embodiments. The VC system 200 may correspond to the VC system 120 in FIG. 1, thus the features associated with the VC system 120 and the VC system 200 may be similarly applicable to each other, unless being explicitly described otherwise.

As illustrated in FIG. 2, the VC system 200 may include at least one communication interface 210, at least one processor 220, at least one input/output component 230, and at least one storage 240, although it can be understood that the VC system 200 may include more or less components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of the VC system 200 to communicate with each other and/or to communicate with one or more components external to the VC system 200, such as via a wired connection, a wireless connection, or a combination of wired and wireless connections. For example, the communication interface 210 may include an Ethernet interface, an optical interface, a coaxial interface, an infrared interface, a radio frequency (RF) interface, a universal serial bus (USB) interface, a Wi-Fi interface, a cellular network interface, or the like.

For instance, the communication interface 210 may couple the processor 220 to the storage 240 to thereby enable them to communicate and to interoperate with each other in performing one or more operations. As another example, communication interface 210 may couple the VC system 200 (or one or more components included therein) to the server 110 and the other vehicle 130, so as to enable them to communicate and to interoperate with each other.

According to one or more embodiments, the communication interface 210 may include one or more application programming interfaces (APIs) which allow the VC system 200 (or one or more components included therein) to communicate with one or more software applications (e.g., software application deployed in the server 110, etc.).

The input/output component 230 may include at least one component that permits the VC system 200 to receive information and/or to provide output information. It can be understood that, in some embodiments, the input/output component 230 may include at least one input component (e.g., a touch screen display, a keyboard, a keypad, a mouse, a button, a switch, a microphone, etc.) and at least one output component (e.g., a display, a speaker, one or more light-emitting diodes (LEDs), etc.), each of which may be separated from each other. Additionally, or alternatively, the at least one input component may include a sensor for sensing information (e.g., a global positioning system (GPS) component, an accelerometer, a gyroscope, and/or an actuator).

The storage 240 may include one or more storage mediums suitable for storing data, information, and/or computer-executable instructions therein. According to embodiments, the storage 240 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. A computer-readable medium is defined herein as a non-transitory memory device. A memory device includes memory space within a single physical storage device or memory space spread across multiple physical storage devices.

According to embodiments, the storage 240 may be configured to store information, such as raw data, metadata, or the like. Additionally or alternatively, the storage 240 may be configured to store one or more information associated with one or more operations performed by the processor 220. For instance, the storage 240 may store information defining the historical operation(s) performed by the processor 220 to manage vehicle communication, one or more results of operations performed by the processor 220, or the like. Further, the storage 240 may store data or information required in managing vehicle communication. For instance, the storage 240 may store the list and the software update information (described below with reference to FIG. 3 to FIG. 7).

In some implementation, the storage 240 may include a plurality of storage mediums, and the storage 240 may be configured to store a duplicate or a copy of at least a portion of the information in the plurality of storage mediums, for providing redundancy and for backing-up the information or the associated data. Furthermore, the storage 240 may also store computer-readable or computer-executable instructions which, when being executed by one or more processors (e.g., processor 220), causes the one or more processors to perform one or more actions/operations described herein The processor 220 may include at least one processor capable of being programmed or being configured to perform a function(s) or an operation(s) described herein. For instance, the processor 220 may be configured to execute computer-executable instructions stored in at least one storage medium or a memory storage (e.g., storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information (in the form of signal or data, etc.) from the server 110 and the other vehicle 130, and to process the received one or more information to thereby manage vehicle communication.

The number and arrangement of components shown in FIG. 2 are provided as an example. In practice, VC system 200 may include additional components, fewer components, different components, or differently arranged components than those shown in FIG. 2. Additionally, or alternatively, a set of components (e.g., one or more components) of VC system 200 may perform one or more functions described as being performed by another set of components of VC system 200.

Descriptions of several example operations which may be performed by the processor 220 are provided below with reference to FIG. 3 to FIG. 7.

Example Operations for Locating a Vehicle in the Present Disclosure

In the following, several example operations performable by the VC system of the present disclosure are described with reference to FIG. 3 to FIG. 4.

Figure 3:
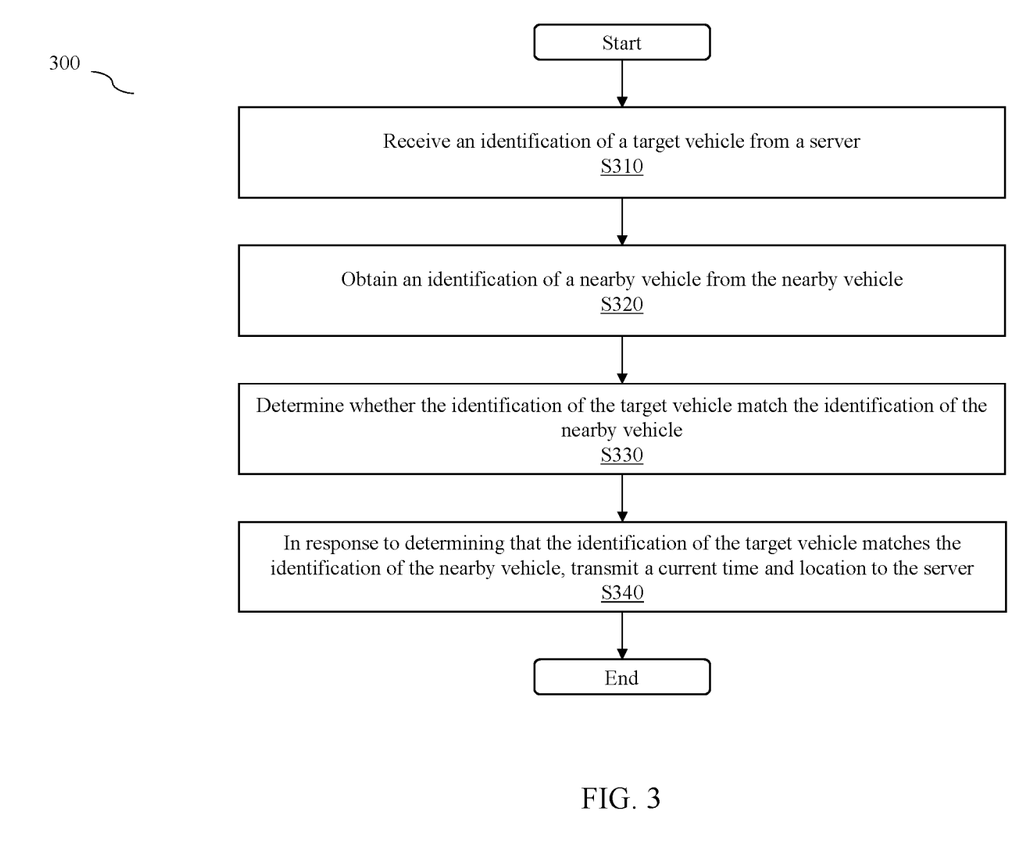
FIG. 3 illustrates a flow diagram of an example method for locating a vehicle, according to one or more embodiments.

FIG. 3 illustrates a flow diagram of an example method 300 for locating a vehicle, according to one or more embodiments. One or more operations in method 300 may be performed by at least one processor (e.g., processor 220) of the VC system.

As illustrated in FIG. 3, at operation S310, the at least one processor may be configured to receive an identification of a target vehicle from a server.

In particular, the target vehicle may be a vehicle which the server would like to locate, but is unable to communicate and transmit its location to the server due to aging components. Accordingly, the server may transmit an identification of the target vehicle to the VC system that is installed in a vehicle (i.e., current vehicle) different from the target vehicle. According to embodiments, it may be understood that the server may transmit the identification of the target vehicle to the VC system that is installed in a plurality of vehicles.

According to embodiments, the identification of the target vehicle may be received via a DCM installed in the current vehicle. According to embodiments, the identification of the target vehicle may include an International Mobile Equipment Identity (IMEI).

According to embodiments, the at least one processor may also be configured to receive a time stamp associated with the identification of the target vehicle from the server. The time stamp may specify the time period when the server would like to know the location of the target vehicle. Accordingly, the VC system may inform the server regarding the target vehicle only within the time period indicated in the time stamp, and may not inform the server regarding the target vehicle once the time stamp has expired, as further described below. The method then proceeds to operation S320.

At operation S320, the at least one processor may be configured to obtain an identification of a nearby vehicle from the nearby vehicle.

In particular, once the VC system receives the identification of the target vehicle, the current vehicle may travel until the current vehicle encounters another vehicle. Once the encountered vehicle is near the current vehicle (e.g., the encountered vehicle is within a communication range of the VC system), the VC system may obtain the identification of that encountered vehicle (i.e., nearby vehicle).

According to embodiments, the at least one processor may communicate and obtain the identification of the nearby vehicle from the nearby vehicle via shortwave radio, direct communication between DCM and DCM, Bluetooth, and the like. Example operations performable by the VC system for communicating with another vehicle are described below.

According to embodiments, the identification of the nearby vehicle may include an International Mobile Equipment Identity (IMEI). The method then proceed to operation S330.

At operation S330, the at least one processor may be configured to determine whether the identification of the target vehicle matches the identification of the nearby vehicle. According to embodiments, the at least one processor may be configured to determine whether the identification of the target vehicle matches the identification of the nearby vehicle by comparing the IMEI of the target vehicle with the IMEI of the nearby vehicle. The method then proceeds to operation S340.

At operation S340, in response to determining that the identification of the target vehicle matches the identification of the nearby vehicle, the at least one processor may be configured to transmit a current time and location to the server.

According to embodiments, the current time may include the time when the VC system encounters the nearby vehicle, the time when the VC system determines that the identification of the target vehicle matches the identification of the nearby vehicle, and the like. Similarly, the current location may include the location where the VC system encounters the nearby vehicle, the location where the VC system determines that the identification of the target vehicle matches the identification of the nearby vehicle, and the like.

According to embodiments, the at least one processor may be configured to also transmit, to the server, a notification indicating that the current vehicle has encountered the target vehicle.

According to embodiments, the at least one processor may be configured to determine whether the received time stamp has expired. Accordingly, the at least one processor may be configured to transmit the current time and location to the server only in response to determining that the received time stamp has not expired.

Upon performing operation S340, the method 300 may be ended or be terminated. Alternatively, method 300 may return to operation S310, such that the at least one processor may be configured to repeatedly perform, for at least a predetermined amount of time, the receiving the identification of the target vehicle (at operation S310), the obtaining the identification of the nearby vehicle (at operation S320), the determining whether the identification of the target vehicle matches the identification of the nearby vehicle (at operation S330), and the transmitting the current time and location (at operation S340).

For instance, the at least one processor may continuously (or periodically) receive more identification of target vehicles that the server would like to locate, and then restart the receiving the identification of the target vehicle (at operation S310), the obtaining the identification of the nearby vehicle (at operation S320), the determining whether the identification of the target vehicle matches the identification of the nearby vehicle (at operation S330), and the transmitting the current time and location (at operation S340).

Accordingly, the above process allows for the server to locate a target vehicle that is unable to communicate and transmit its location to the server due to aging components. The above process also allows for the server to determine the approximate number of vehicles that are traveling on a particular road.

For example, a law enforcement entity may want to locate a target vehicle but may be unable to do so due to the target vehicle's aging components. In this regard, the law enforcement entity may notify the server (e.g., Toyota) and provide a Vehicle Identification Number (VIN) of the target vehicle. The server may then identify the DCM installed in the target vehicle and the associated International Mobile Equipment Identity (IMEI), based on the VIN via the Enterprise Resource Planning Database (ERP). Subsequently, the server may transmit that IMEI to a plurality of vehicles that are traveling in an area where the target vehicle was last seen, such that the plurality of vehicles may identify and locate the target vehicle. The IMEI may also be accompanied by a time stamp of when the alert expires (i.e., when the server no longer needs to be notified about the target vehicle). The server may also compile a list of IMEIs and transmit said list to the vehicles, in order to locate a plurality of target vehicles.

Figure 4:
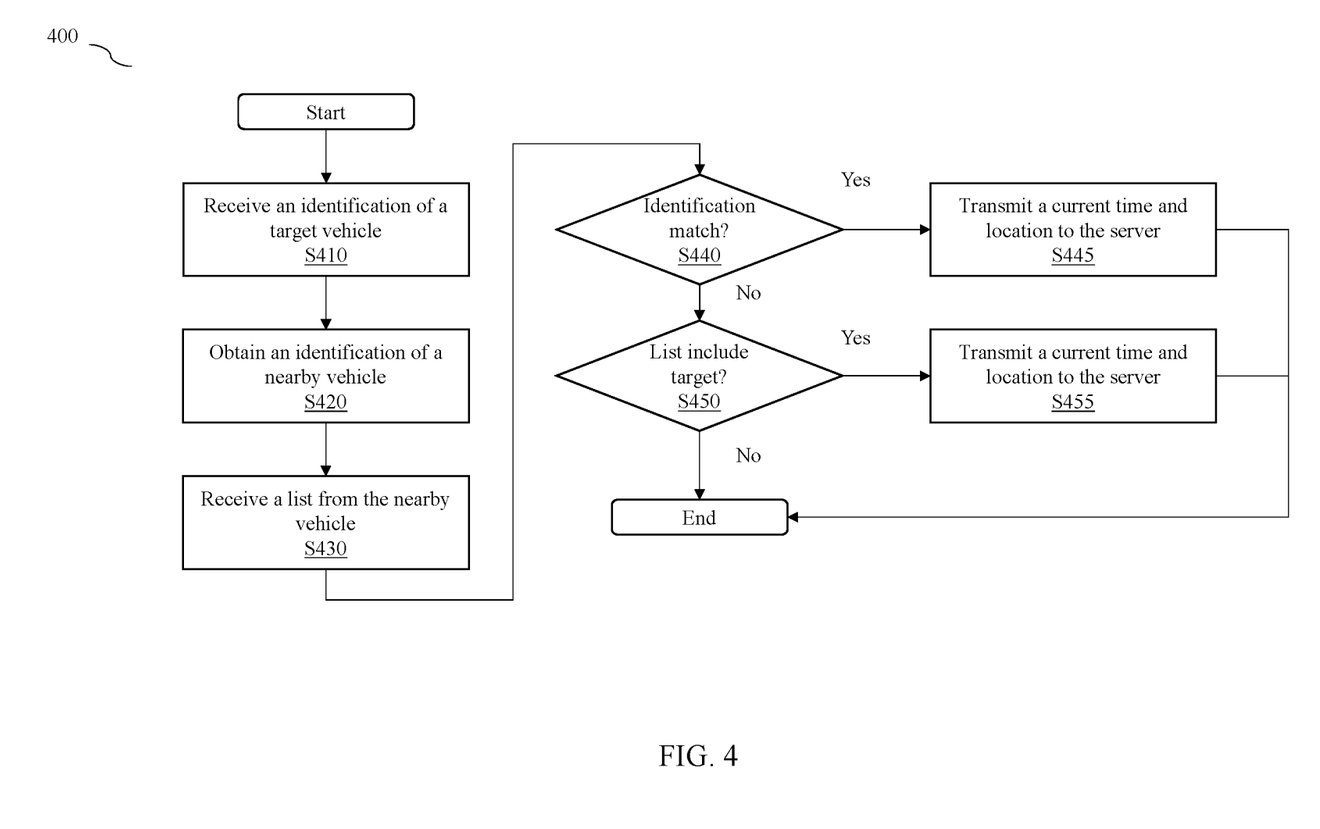
FIG. 4 illustrates a flow diagram of an example method for locating a vehicle, according to one or more embodiments.

FIG. 4 illustrates a flow diagram of an example method 400 for locating a vehicle, according to one or more embodiments. One or more operations of method 400 may be part of operation S310, S320, S330, and S340 in method 300, and may be performed by at least one processor (e.g., processor 220) of the VC system.

As illustrated in FIG. 4, at operation S410, the at least one processor may be configured to receive an identification of a target vehicle from a server, in a similar manner as operation S310 in method 300. The method then proceeds to operation S420.

At operation S420, the at least one processor may be configured to obtain an identification of a nearby vehicle from the nearby vehicle, in a similar manner as operation S320 in method 300. The method then proceeds to operation S430.

At operation S430, the at least one processor may be configured to receive a list from the nearby vehicle. According to embodiments, the list may include one or more identification of vehicles which the nearby vehicle has identified previously. For example, the list may include one or more IMEIs which the nearby vehicle has identified previously. According to embodiments, the list may include a hashed list that is encrypted.

In particular, for example, once a vehicle encounters another vehicle and obtains the IMEI, the obtained IMEI may be recorded in a list, such that the list includes a record of IMEIs (and by extension the associated vehicles) that said vehicle has encountered before.

As such, according to embodiments, the at least one processor may be configured to record the obtained identification of the nearby vehicle in a list, such that the VC system may store a list including one or more identification of vehicles which the current vehicle has identified previously. Similarly, the nearby vehicle may also have a list including one or more identification of vehicles which the nearby vehicle has identified previously. The recorded list may be stored locally without being transmitted to the server, thereby preserving the user's privacy (unless the server requests the location of the user's vehicle).

According to embodiments, the VC system may also transmit the list to the nearby vehicle, such that the list of the current vehicle and the list of the nearby vehicle are exchanged. For example, if the current vehicle determines that the identification of the target vehicle matches the identification of the nearby vehicle (i.e., a first nearby vehicle), and then the current vehicle encounters another vehicle (i.e., a second nearby vehicle different from the first nearby vehicle), the at least one processor may be configured to transmit the list to the second nearby vehicle. According to embodiments, the at least one processor may also be configured to transmit the received time stamp associated with the identification of the target vehicle along with the list. The method then proceeds to operation S440.

At operation S440, the at least one processor may be configured to determine whether the identification of the target vehicle matches the identification of the nearby vehicle, in a similar manner as operation S330 in method 300.

Accordingly, based on determining that the identification of the target vehicle matches the identification of the nearby vehicle, the at least one processor may determine that the nearby vehicle is the target vehicle, and the method proceeds to operation S445. On the other hand, based on determining that the identification of the target vehicle does not match the identification of the nearby vehicle, the at least one processor may determine that the nearby vehicle is not the target vehicle, and the method proceeds to operation S450.

At operation S445, the at least one processor may be configured to transmit a current time and location to the server, in a similar manner as operation S340 in method 300.

At operation S450, the at least one processor may be configured to determine whether the received list includes the identification of the target vehicle. According to embodiments, the at least one processor may be configured to determine whether the received list includes the identification of the target vehicle by determining whether the identification of the target vehicle matches any of the one or more identification of vehicles in the received list (i.e., one or more identification of vehicles which the nearby vehicle has identified previously).

Accordingly, based on determining that the received list includes the identification of the target vehicle, the at least one processor may determine that the nearby vehicle has encountered the target vehicle previously, and the method proceeds to operation S455. On the other hand, based on determining that the received list does not include the identification of the target vehicle, the at least one processor may determine that the nearby vehicle has not encountered the target vehicle previously, and the method proceeds to end.

At operation S455, the at least one processor may be configured to transmit a current time and location to the server, in a similar manner as operation S445.

According to embodiments, the current time may include the time when the VC system encounters the nearby vehicle, the time when the VC system determines that the received list includes the identification of the target vehicle, and the like. Similarly, the current location may include the location where the VC system encounters the nearby vehicle, the location where the VC system determines that the received list includes the identification of the target vehicle, and the like.

According to embodiments, the at least one processor may be configured to also transmit, to the server, a notification indicating that the current vehicle has encountered a vehicle that has encountered the target vehicle previously.

According to embodiments, the at least one processor may be configured to determine whether the received time stamp has expired. Accordingly, the at least one processor may be configured to transmit the current time and location to the server only in response to determining that the received time stamp has not expired.

Upon performing operation S445, S450, and/or S455, the method 400 may be ended or be terminated. Alternatively, method 400 may return to operation S410, such that the at least one processor may be configured to repeatedly perform, for at least a predetermined amount of time, the receiving the identification of the target vehicle (at operation S410), the obtaining the identification of the nearby vehicle (at operation S420), the receiving the list (at operation S430), the determining whether the identification of the target vehicle matches the identification of the nearby vehicle (at operation S440), the transmitting the current time and location (at operation S445), the determining whether the received list includes the identification of the target vehicle (at operation S450), and the transmitting the current time and location (at operation S455).

For instance, the at least one processor may continuously (or periodically) receive more identification of target vehicles that the server would like to locate, and then restart the receiving the identification of the target vehicle (at operation S410), the obtaining the identification of the nearby vehicle (at operation S420), the receiving the list (at operation S430), the determining whether the identification of the target vehicle matches the identification of the nearby vehicle (at operation S440), the transmitting the current time and location (at operation S445), the determining whether the received list includes the identification of the target vehicle (at operation S450), and the transmitting the current time and location (at operation S455).

As another example, the VC system and the current vehicle may continuously (or periodically) encounter more vehicles, and then restart the obtaining the identification of the nearby vehicle (at operation S420), the receiving the list (at operation S430), the determining whether the identification of the target vehicle matches the identification of the nearby vehicle (at operation S440), the transmitting the current time and location (at operation S445), the determining whether the received list includes the identification of the target vehicle (at operation S450), and the transmitting the current time and location (at operation S455).

Accordingly, the above process allows for the server to locate a target vehicle that is unable to communicate and transmit its location to the server due to aging components, as well as to obtain updates regarding the location of the target vehicle as the target vehicle travels and encounters more vehicles over time, along with the direction, speed, and path the target vehicle is taking. The above process also allows for the server to determine the approximate number of vehicles that are traveling on a particular road.

Example Operations for Assisting a Vehicle Software Update in the Present Disclosure In the following, several example operations performable by the VC system of the present disclosure are described with reference to FIG. 5 and FIG. 7.

Figure 5:
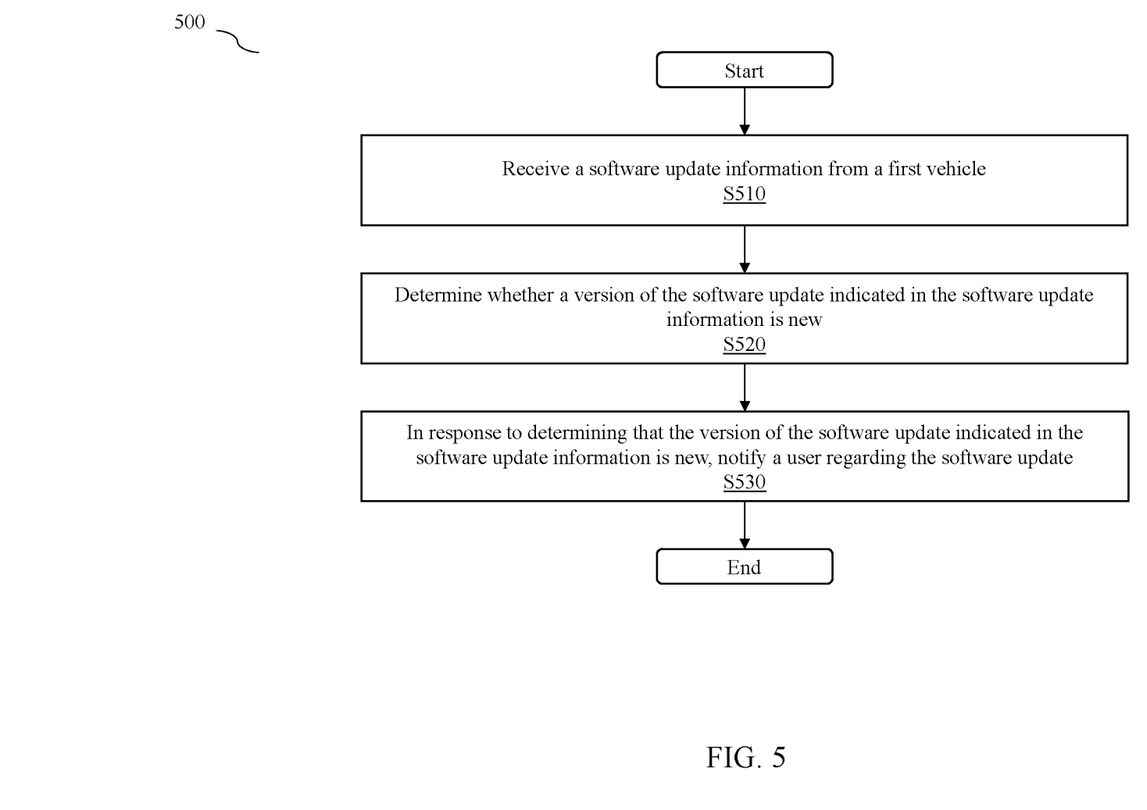
FIG. 5 illustrates a flow diagram of an example method for assisting a vehicle software update, according to one or more embodiments.

FIG. 5 illustrates a flow diagram of an example method 500 for assisting a vehicle software update, according to one or more embodiments. One or more operations in method 500 may be performed by at least one processor (e.g., processor 220) of the VC system.

Initially, when a software update becomes available, a first vehicle may be able to communicate and receive the software update. For example, the first vehicle may be among a first wave of vehicles that receive the software update after the software update is released (e.g., first week after release). However, a second vehicle may not be able to communicate and receive the software update due to its aging components.

Accordingly, one or more operations in method 500 may be performed by at least one processor (e.g., processor 220) of the VC system installed in the second vehicle.

In this regard, the first vehicle may be configured to first receive a software update and a software update information.

The software update and the software update information may be received from the server. Further, the software update may have a time stamp and a version number. According to embodiments, the software update information may include information regarding the software update (i.e., the received software update), but may not include the software update itself. For example, the software update information may include information related to the software update, such as a version of the software update, the size of the software update, the nature of the software update (e.g., safety-critical/non-safety-critical), when the software update becomes available, how to obtain the software update, and the like. According to embodiments, the software update information may be transmitted by the first vehicle to other vehicles (e.g., second vehicle), as further described below.

According to embodiments, the first vehicle may also be configured to receive a first digital certificate. The first digital certificate may be received by the first vehicle from the server, such that the first vehicle acts as a notification vehicle. Further, the first digital certificate may be associated with the software update information and the software update, and may have an expiration date. The expiration date may be any time depending on the importance of the software update. For example, a first digital certificate that is associated with non-safety-critical updates may have an expiration date of 30 days, 60 days, and the like; while a first digital certificate that is associated with safety-critical updates may have an expiration date of 90 days and the like. According to embodiments, the first digital certificate may be configured to authenticate the first vehicle for transmitting the software update information to other vehicles (e.g., the second vehicle). Once the first digital certificate has expired, the first vehicle may remove the software update information from storage, and may no longer be authorized to transmit any software update information to other vehicles. Similarly, the second vehicle may be configured to receive software update information only when such software update information is accompanied by a digital certificate. As such, the expiration date of the first digital certificate (as well as of the second digital certificate described below) may allow the server to define the time period when the server would like to notify the vehicles regarding the software update, while also serving as an authentication means.

Accordingly, the above process improves security and prevents unauthorized and/or malicious broadcasting of software updates.

As illustrated in FIG. 5, at operation S510, the at least one processor may be configured to receive the software update information from the first vehicle.

According to embodiments, the first vehicle may also be configured to transmit the first digital certificate to the second vehicle for authentication. Once the second vehicle authenticates the first digital certificate, the second vehicle may accept the transmission of the software update information from the first vehicle. Example operations performable by the VC system for communicating with another vehicle are described below. The method then proceeds to operation S520.

At operation S520, the at least one processor may be configured to determine whether a version of the software update indicated in the software update information is new in comparison to a version of a software currently installed in the second vehicle.

Accordingly, based on determining that the version of the software update indicated in the software update information is new in comparison to the version of the software currently installed in the second vehicle, the at least one processor may determine that the software update should be received, and the method proceeds to operation S530. On the other hand, based on determining that the version of the software update indicated in the software update information is not new in comparison to the version of the software currently installed in the second vehicle (i.e., the second vehicle already has this version of the software update, or have a newer version), the at least one processor may determine that it is not necessary to receive the software update, and the method proceeds to end.

At operation S530, the at least one processor may be configured to notify a user regarding the software update. The user may include the driver of the second vehicle.

Upon performing operation S530, the method 500 may be ended or be terminated. Alternatively, method 500 may return to operation S510, such that the at least one processor may be configured to repeatedly perform, for at least a predetermined amount of time, the receiving the software update information (at operation S510), the determining whether the version of the software update indicated in the software update information is new in comparison to the version of the software currently installed in the second vehicle (at operation S520), and the notifying the user (at operation S530).

For instance, the at least one processor may continuously (or periodically) receive more software update information from a first vehicle or a different vehicle, and then restart the receiving the software update information (at operation S510), the determining whether the version of the software update indicated in the software update information is new in comparison to the version of the software currently installed in the second vehicle (at operation S520), and the notifying the user (at operation S530).

Accordingly, the above process allows for the second vehicle, which is unable to communicate and receive software update from the server due to aging components, to be notified of an available software update. Accordingly, the driver of the second vehicle may be notified to go and receive the software update.

Figure 6:
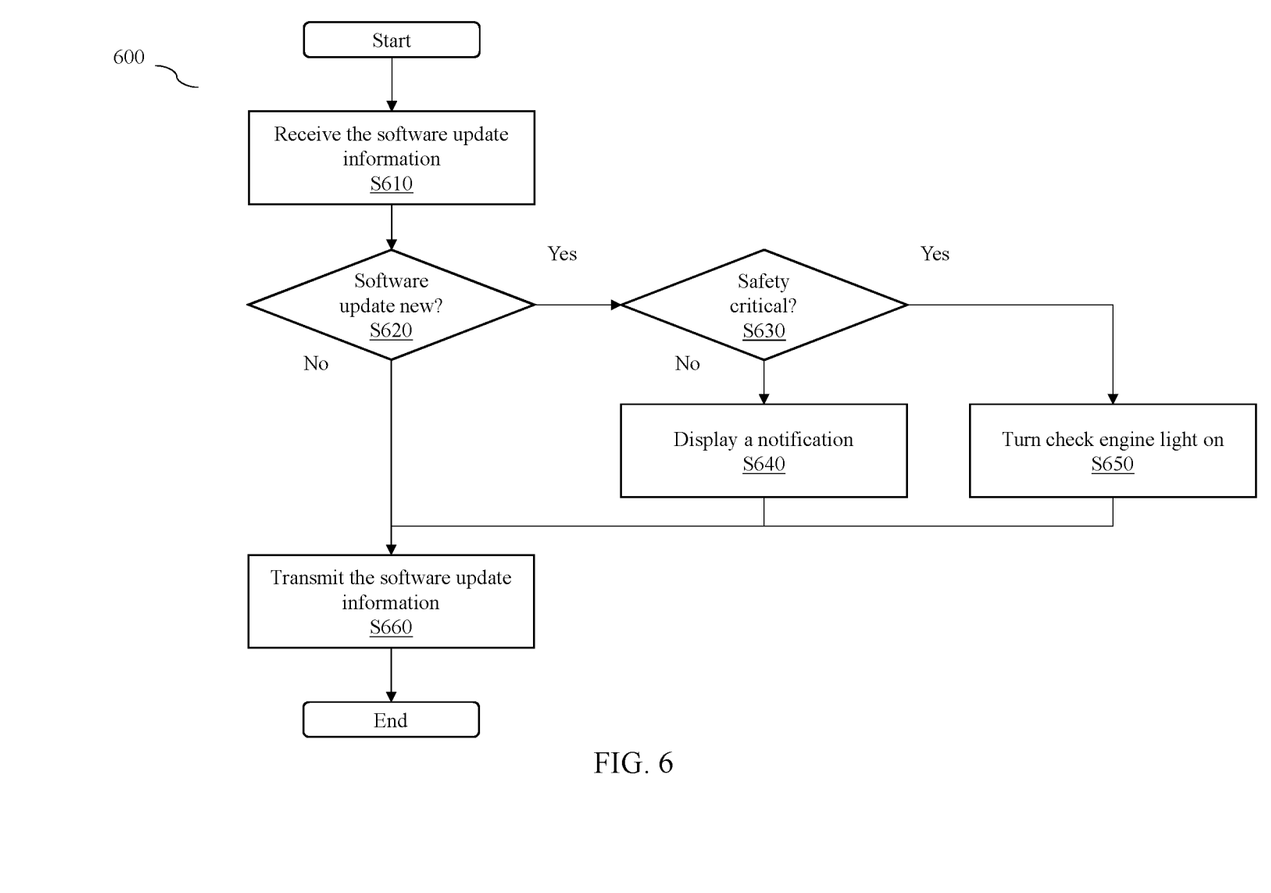
FIG. 6 illustrates a flow diagram of an example method for assisting a vehicle software update, according to one or more embodiments.

FIG. 6 illustrates a flow diagram of an example method 600 for assisting a vehicle software update, according to one or more embodiments. One or more operations of method 600 may be part of operation S510, S520, and S530, in method 500, and may be performed by at least one processor (e.g., processor 220) of the VC system installed in the second vehicle.

As illustrated in FIG. 6, at operation S610, the at least one processor may be configured to receive the software update information from the first vehicle, in a similar manner as operation S510 in method 500. The method then proceeds to operation S620.

At operation S620, the at least one processor may be configured to determine whether a version of the software update indicated in the software update information is new in comparison to a version of a software currently installed in the second vehicle, in a similar manner as operation S520 in method 500.

Accordingly, based on determining that the version of the software update indicated in the software update information is new in comparison to the version of the software currently installed in the second vehicle, the at least one processor may determine that the software update should be received, and the method proceeds to operation S630. On the other hand, based on determining that the version of the software update indicated in the software update information is not new in comparison to the version of the software currently installed in the second vehicle (i.e., the second vehicle already has this version of the software update, or have a newer version), the at least one processor may determine that it is not necessary to receive the software update, and the method proceeds to operation S660.

At operation S630, the at least one processor may be configured to determine whether the software update is safety-critical. According to embodiments, the at least one processor may be configured to determine whether the software update is safety-critical, based on the received software update information.

Accordingly, based on determining that the software update is safety-critical, the at least one processor may determine that the user should be urgently notified, and the method proceeds to operation S650. On the other hand, based on determining that the software update is not safety-critical, the at least one processor may determine that the user does not need to be urgently notified, and the method proceeds to operation S640.

At operation S640, the at least one processor may be configured to display a notification to a user. The notification may include, for example, a message indicating that a software update is available. The notification may further include a method of how to obtain the software update. According to embodiments, the notification may be displayed via an In-Vehicle Infotainment (IVI) system of the second vehicle. According to embodiments, the message may be displayed the next time the user starts the second vehicle. The user may include the driver of the second vehicle. The method then proceeds to operation S660.

At operation S650, the at least one processor may be configured to turn a check engine light on. The method then proceeds to operation S660.

At operation S660, the at least one processor may be configured to transmit the software update information to a third vehicle. The third vehicle may be different from the first vehicle and the second vehicle, and may also be unable to communicate with the server due to aging components.

According to embodiments, once the second vehicle receives and authenticates the first digital certificate from the first vehicle, the at least one processor may be configured to generate a second digital certificate based on the first digital certificate. The second digital certificate may be associated with the software update information and the software update, and may have an expiration date. The expiration date of the second digital certificate may be the remaining time of the expiration date of the first digital certificate. For example, if the first digital certificate has an initial expiration date of 60 days, but has an expiration date of 22 days remaining at the time when the second vehicle receives and authenticates the first digital certificate from the first vehicle, the expiration date of the second digital certificate may be 22 days. According to embodiments, the second digital certificate may be configured to authenticate the second vehicle for transmitting the software update information to other vehicles (e.g., the third vehicle). Once the second digital certificate has expired, the second vehicle may remove the software update information from storage, and may no longer be authorized to transmit any software update information to other vehicles.

As such, according to embodiments, the at least one processor may also be configured to determine whether the second digital certificate has expired. Accordingly, the at least one processor may be configured to transmit the software update information to the third vehicle only in response to determining that the second digital certificate has not expired.

According to embodiments, the first digital certificate may have a limit on how many second digital certificates can be generated from the first digital certificate. For example, the first digital certificate may have a limit of 6, and thus only 6 second digital certificates can be generated from the first digital certificate. The limit of 6 has been shown to be the mean for communication amongst large networks of vehicles.

Upon performing operation S660, the method 600 may be ended or be terminated. Alternatively, method 600 may return to operation S610, such that the at least one processor may be configured to repeatedly perform, for at least a predetermined amount of time, the receiving the software update information (at operation S610), the determining whether the version of the software update indicated in the software update information is new in comparison to the version of the software currently installed in the second vehicle (at operation S620), the determining whether the software update is safety-critical (at operation S630), the displaying the notification (at operation S640), the turning the check engine light on (at operation S650), and the transmitting the software update information (at operation S660).

For instance, the at least one processor may continuously (or periodically) receive more software update information from a first vehicle or a different vehicle, and then restart the receiving the software update information (at operation S610), the determining whether the version of the software update indicated in the software update information is new in comparison to the version of the software currently installed in the second vehicle (at operation S620), the determining whether the software update is safety-critical (at operation S630), the displaying the notification (at operation S640), the turning the check engine light on (at operation S650), and the transmitting the software update information (at operation S660).

Accordingly, the above process allows for the second vehicle as well as the third vehicle, which are unable to communicate and receive software update from the server due to aging components, to be notified of an available software update. Accordingly, the drivers of the second vehicle and the third vehicle may be notified to go and receive the software update, and may be notified of how to receive the software update (e.g., go to a dealer, go to a designated location, and the like). The above process also allows for safety-critical updates to be timely notified to the driver, which reduces risks associated with such safety-critical updates.

Figure 7:
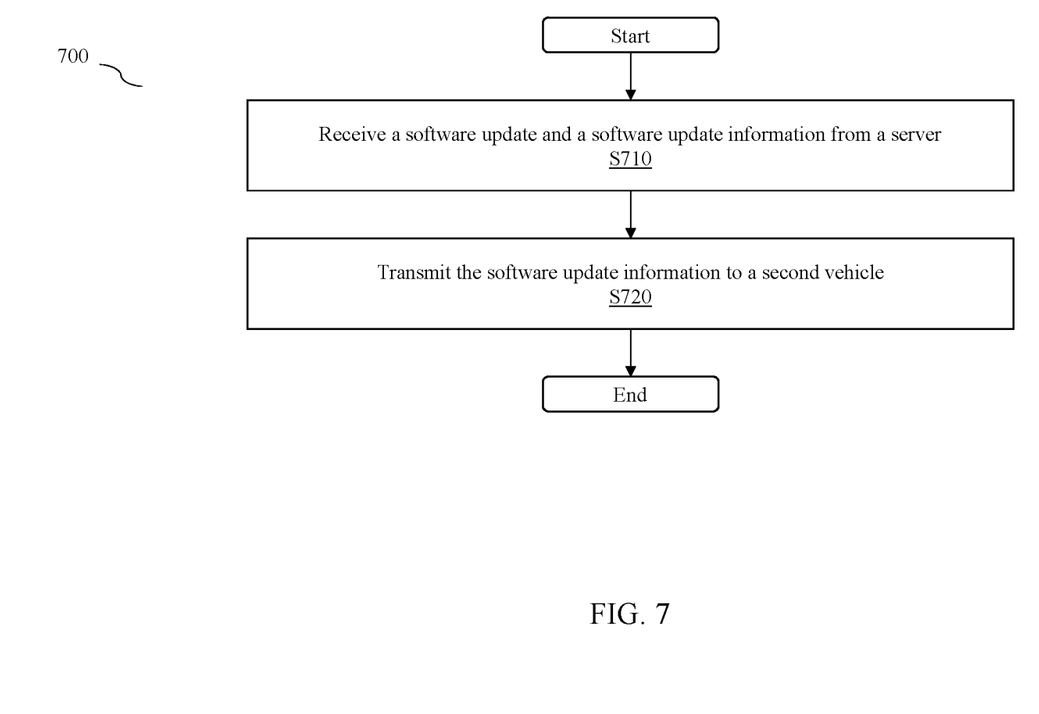
FIG. 7 illustrates a flow diagram of an example method for assisting a vehicle software update, according to one or more embodiments.

FIG. 7 illustrates a flow diagram of an example method 700 for assisting a vehicle software update, according to one or more embodiments. One or more operations in method 700 may be performed by at least one processor (e.g., processor 220) of the VC system installed in the first vehicle.

As illustrated in FIG. 7, at operation S710, the at least one processor may be configured to receive a software update and a software update information from a server, in the similar manner as described above. The method then proceeds to operation S720.

At operation S720, the at least one processor may be configured to transmit the software update information to the second vehicle. According to embodiments, the at least one processor may be configured to determine whether the first digital certificate has expired. Accordingly, the at least one processor may be configured to transmit the software update information to the second vehicle only in response to determining that the first digital certificate has not expired.

Upon performing operation S720, the method 700 may be ended or be terminated. Alternatively, method 700 may return to operation S710, such that the at least one processor may be configured to repeatedly perform, for at least a predetermined amount of time, the receiving the software update and the software update information (at operation S610), and the transmitting the software update information (at operation S720).

For instance, the at least one processor may continuously (or periodically) receive more software update from the server, and then restart the receiving the software update and the software update information (at operation S610), and the transmitting the software update information (at operation S720).

Example Communications Between Vehicles

The following describes example flow of operations performable by the VC system for communicating with another vehicle. In particular, the VC system may be installed in a vehicle, which is traveling in the same direction with another vehicle for a period of time.

In a first example, the VC system may be configured to observe, via a DCM, a callback of a DCM installed in the other vehicle. As such, the vehicle which the VC system is installed may act as an initiator vehicle, while the other vehicle may act as a receptor vehicle.

According to embodiments, the initiator vehicle may be configured to initiate vehicle to vehicle communications with the receptor vehicle, where both vehicles may exchange a hashed list of IMEIs that they have encountered previously. The vehicle to vehicle communications may be performed via shortwave radio, direct communication between Digital Communications Module (DCM) and Digital Communications Module (DCM), Bluetooth, and the like as appropriate based on the situation. For example, Bluetooth may be utilized when the range between the vehicles is sufficient, while shortwave radio may be utilized if the receptor vehicle is using an older cellular standard. Further, the hashed list may be encrypted with a private key of a corresponding vehicle (e.g., the hashed list of the initiator vehicle may be encrypted with a private key of the initiator vehicle), while a corresponding public key may be exchanged together with the list.

Once the hashed lists and the public keys are exchanged, the hashed lists and the public keys may be stored. For example, once the initiator vehicle receives the hashed list and public key of the receptor vehicle, the initiator vehicle may store the received hashed list and public key of the receptor vehicle. The received hashed list may be included in further transfer with other vehicles as a leaf node, as part of a transfer package. Further, the hashed list may receive an expiration date, defining a period time between when the hashed list is received and when the hashed list should be removed. The expiration date may be any date, such as 30 days from when the hashed list is received. The stored data may not leave the vehicle, and only the expiration date may be stored in an unencrypted format.

According to embodiments, the initiator vehicle and the receptor vehicle may have a size limit of hashed lists that can be stored. For example, the initiator vehicle and the receptor vehicle may store no more than 10 megabytes of data of the hashed list in this format. As these lists are text only, this is a substantial amount of data.

According to embodiments, the vehicles may constantly refresh the above data during their lifespan. Further, the data may be stored in s memory and may only be written to a disk when the vehicle is started or stopped.

It may be understood that, once the hashed list is received, the vehicles may unpack the received data structure, walk through the tree with the IMEI, and hashing it to see if a match is found.

In a second example, the VC system may be configured to observe the other vehicle, but the other vehicle may not be using a DCM.

Acceding to embodiments, the VC system may be configured to observe and record the IMEI number of the other vehicle. The VC system may also be configured to record the geographical location and time stamp of when and where the other vehicle was observed.

According to embodiments, the VC system may be configured to record all IMEIs that it has encountered in a week in a daily format. The VC system may then take an average number for the number of IMEIs observed and store that number of IMEIs. This measurement may be repeated once every quarter, in case a vehicle's commute or driving pattern changes.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
  a memory storage storing computer-executable instructions; and
  at least one processor communicatively coupled to the memory storage, wherein the at least one processor is configured to execute the instructions to:
    receive an identification of a target vehicle from a server, wherein the target vehicle is unable to communicate with the server;
    obtain an identification of a nearby vehicle from the nearby vehicle using wireless communication with the nearby vehicle;
    determine whether the identification of the target vehicle matches the identification of the nearby vehicle; and
    in response to determining that the identification of the target vehicle matches the identification of the nearby vehicle, transmit a current time and location to the server.

2. The system according to claim 1, wherein the at least one processor is further configured to execute the instructions to:
  receive a list from the nearby vehicle;
  in response to determining that the identification of the target vehicle does not match the identification of the nearby vehicle, determine whether the received list includes the identification of the target vehicle; and in response to determining that the received list includes the identification of the target vehicle, transmit the current time and the location to the server.

3. The system according to claim 2, wherein the received list comprises a hashed list including one or more International Mobile Equipment Identity (IMEI) which the nearby vehicle has identified.

4. The system according to claim 1, wherein the at least one processor is further configured to execute the instructions to record the obtained identification of the nearby vehicle in a list.

5. The system according to claim 4, wherein:
the nearby vehicle is a first nearby vehicle; and
the at least one processor is configured to execute the instructions to transmit the list to a second nearby vehicle.

6. The system according to claim 1, wherein the identification of the target vehicle and the identification of the nearby vehicle comprises an International Mobile Equipment Identity (IMEI).

7. The system according to claim 1, wherein the identification of the nearby vehicle is received via shortwave radio, direct communication via a Digital Communications Module (DCM), or Bluetooth.

8. A method comprising:
receiving an identification of a target vehicle from a server, wherein the target vehicle is unable to communicate with the server;
obtaining an identification of a nearby vehicle from the nearby vehicle using wireless communication with the nearby vehicle;
determining whether the identification of the target vehicle matches the identification of the nearby vehicle; and
in response to determining that the identification of the target vehicle matches the identification of the nearby vehicle, transmitting a current time and location to the server.

9. The method according to claim 8, wherein the method further comprises:
receiving a list from the nearby vehicle;
in response to determining that the identification of the target vehicle does not match the identification of the nearby vehicle, determining whether the received list includes the identification of the target vehicle; and
in response to determining that the received list includes the identification of the target vehicle, transmitting the current time and the location to the server.

10. The method according to claim 9, wherein the received list comprises a hashed list including one or more International Mobile Equipment Identity (IMEI) which the nearby vehicle has identified.

11. The method according to claim 8, wherein the method further comprises recording the obtained identification of the nearby vehicle in a list.

12. The method according to claim 11, wherein:
the nearby vehicle is a first nearby vehicle; and
the method further comprises transmitting the list to a second nearby vehicle.

13. The method according to claim 8, wherein the identification of the target vehicle and the identification of the nearby vehicle comprises an International Mobile Equipment Identity (IMEI).

14. The method according to claim 8, wherein the identification of the nearby vehicle is received via shortwave radio, direct communication via a Digital Communications Module (DCM), or Bluetooth.

15. A non-transitory computer-readable recording medium having recorded thereon instructions executable by at least one processor to cause the at least one processor to perform a method comprising:
receiving an identification of a target vehicle from a server, wherein the target vehicle is unable to communicate with the server;
obtaining an identification of a nearby vehicle from the nearby vehicle using wireless communication with the nearby vehicle;
determining whether the identification of the target vehicle matches the identification of the nearby vehicle; and
in response to determining that the identification of the target vehicle matches the identification of the nearby vehicle, transmitting a current time and location to the server.

16. The non-transitory computer-readable recording medium according to claim 15, wherein the method further comprises:
receiving a list from the nearby vehicle;
in response to determining that the identification of the target vehicle does not match the identification of the nearby vehicle, determining whether the received list includes the identification of the target vehicle; and
in response to determining that the received list includes the identification of the target vehicle, transmitting the current time and the location to the server.

17. The non-transitory computer-readable recording medium according to claim 16, wherein the received list comprises a hashed list including one or more International Mobile Equipment Identity (IMEI) which the nearby vehicle has identified.

18. The non-transitory computer-readable recording medium according to claim 15, wherein the method further comprises recording the obtained identification of the nearby vehicle in a list.

19. The non-transitory computer-readable recording medium according to claim 18, wherein:
the nearby vehicle is a first nearby vehicle; and
the method further comprises transmitting the list to a second nearby vehicle.

20. The non-transitory computer-readable recording medium according to claim 15, wherein the identification of the target vehicle and the identification of the nearby vehicle comprises an International Mobile Equipment Identity (IMEI).

* * * * *